United States Patent Office 3,427,306
Patented Feb. 11, 1969

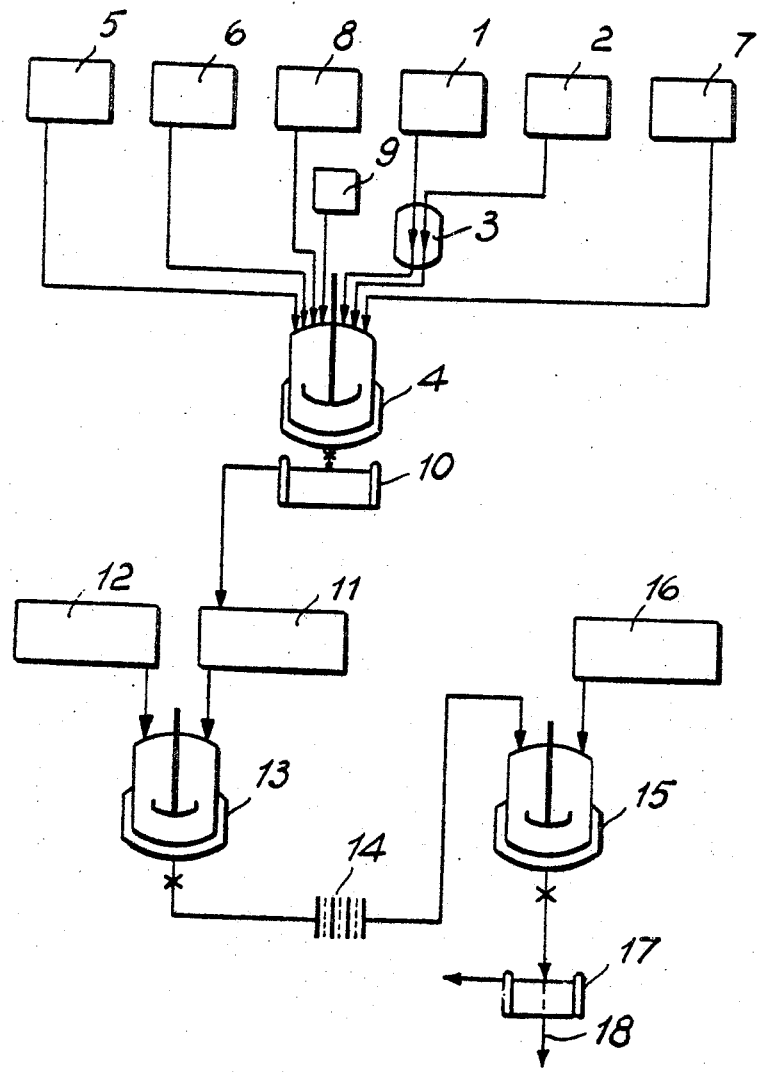

3,427,306
PROCESS FOR THE MANUFACTURE OF N-(5 - NITRO - 2 - FURFURYLIDEN) - 1 - AMINO-HYDANTOIN
Mario Portelli, Vicenza, Italy, assignor to Zambon S.p.A. (Bresso), Milan, Italy
Filed Aug. 13, 1965, Ser. No. 480,252
U.S. Cl. 260—240
Int. Cl. C07d 49/32
2 Claims

ABSTRACT OF THE DISCLOSURE

A process for preparing N-(5-nitro-2-furfuryliden)-1-amino-hydantoin from monochloroacetic acid, hydrazine hydrate, and alkali cyanate and 5-nitro-2-furfuraldehyde diacetate in a single aqueous phase, without separation of any intermediate compound, characterized in that the monochloroacetic acid is slowly added to an aqueous solution of hydrazine hydrate and sodium hydroxide at a temperature of 0°–5° C., and allowed to react under stirring for several more hours. To the reaction mixture alkali cyanate is added under suitable pH and temperature conditions, and to this reacted mixture nitrofurfuraldehyde diacetate in acid medium is added at a temperature between 70° and 90° C. The formed product is separated by cooling and crystallization, and may be used as an antibacterial drug.

---

The present invention relates to a new process for the preparation of N-(5-nitro-2-furfuryliden)-1-amino - hydantoin nitrofurantoin), a well-known, highly important antibacterial drug for the treatment of the urinary tract infections, having the following formula:

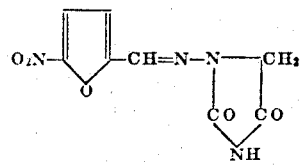

More precisely the present invention relates to a process which allows the preparation of nitrofurantoin starting from economical, widely available products such as hydrazine, mono-chloro-acetic acid, an alkali cyanate and nitrofurfuraldehyde diacetate, in a single aqueous phase, with no intermediate product separated, i.e. with a process very suitable to be realized on an industrial scale.

A number of processes have been proposed up to now to prepare the very important nitrofurantoin, but they all are of interest only for the making of small qauntites in laboratory, and are highly cumbersome and expensive when applied on an industrial scale, since they require the preparation of a number of special intermediate products to be separated and purified each time before passing to the following stage as well as the use of large excess of regaents and of expensive organic solvents, which both require subsidiary recovery cycles.

In particular it was proposed to prepare nitrofurantoin starting from hydrazine hydrate and monochloroacetic acid, obtaining a hydrazino-monoacetic acid as a first intermediate of a many step nitrofurantoin synthesis accomplished through many other successive, separated steps (British Patent No. 757,822).

However this process was found quite unsatisfactory and then abandoned for other processes where more complex and difficult to prepare starting products were used, because, in order to avoid the formation of large proportions of hydrazino-diacetic acid as undesired by-product, at least 6 times excess of hydrazine, and commonly 7 times excess of hydrazine, should be used [Journal of Pharmacy and Pharmacology, vol. 11, pp. 108T–114T (1959)].

What rendered industrially unacceptable the process starting from hydrazine and monochloroacetic acid, was the recovery cycle of such an important amount of hydrazine performed through the addition of an inert high boiling diluent, which in turn rendered even more cumbersome the preparation and the recovery cycles.

Now I have very surprisingly found that, by operating under certain critical conditions, it is possible to allow the reaction between hydrazine and mono-chloroacetic acid to proceed essentially to hydrazino-monoacetic acid, while using no excess at all or at the most an excess as high as 10% of hydrazine. Such a surprising finding has resulted in a new process for production of nitrofurantoin having no hydrazine and organic solvents to recover, and no excess reagents or extraneous solvents which can interfere with or be not suitable to the reagents of the subsequent reactions, no separation of the intermediate products is required but the reaction product of every step is directly submitted to the following reaction.

It is then an object of the present invention to provide a process for the preparation of nitrofurantoin starting from monochloroacetic acid, hydrazine, an alkali cyanate and nitrofuraldeide diacetate where hydrazine is used in equimolecular amount or in a molar amount not exceeding 10% excess with respect to monochloroacetic acid.

It is a further object of the present invention to provide a process where no organic solvent is used, with the exception of that needed for the final purification by crystallization of the product.

It is another object of the invention to provide a process where the above named reactants are added in succession, under the conditions found as critical for each of them, in the same reactor in a single aqueous phase, wherefrom only the final product nitrofurantoin is withdrawn to be purified.

It is still another object of the invention to provide a process which requires a very simple equipment, with consequent material savings on installation costs.

Other objects of the invention will be apparent from the following brief description of the process and from the given example and the attached drawing.

According to the process of the present invention an aqeuous solution of hydrazine, preferably an 80–85% aqueous solution, is added along with a 30% aqueous sodium hydroxide; to this solution is added an aqueous solution of monochloroacetic acid in such a manner that the addition will be completed in a time of several hours, in any case in a time not below 12 hours.

During the reaction the temperature is kept at 0°–5° and the reactants are admixed in the preferred ratios: mono-chloroacetic acid:hydrazine:sodium hydroxide=1:1.1:2.5

After the addition of monochloro acetic acid is completed, the reacting mixture is left under stirring still for several hours, preferably for about 12 hours, while always keeping the mass at 0°–5° C.

Thereafter the mass is acidified up to a pH value 3–4 and an alkali cyanate is introduced in the reaction space. The temperature is allowed to spontaneously rise to room temperature and is kept at this level for 3 to 5 hours, whereupon the pH-value is maintained at 5.5–6.5. The preferred alkali cyanate is potassium cyanate.

Then the temperature is gradually raised to between 70° and 90° C. while the solution is again acidified. Preferably the heating of the reacting mass is performed in two steps; first the temperature is kept at 70°–75° C. and then for some minutes at 90° C. The acidification is performed by means of hydrochloric acid.

Finally, always keeping the temperature between 70° and 90° C., and preferably between 80° and 85° C., about 0.2 mole of nitrofurfuraldehyde diacetate, for each mole of mono-chloroacetic acid, are added.

At the end of the reaction, the mass is cooled down to room temperature, thus causing the crystallization of the raw nitrofurantoin, which can be separated and purified.

In summation, the reactants are made to react, to give nitrofurantoin, preferably in the following molar ratios: hydrazine:monochloro-acetic acid:alkali cyanate:nitrofurfuraldehyde diacetate=1.1:1:1.1:0.2.

Ratios higher than those indicated may be used but no advantage at all can derive from this.

In the reaction between hydrazine and monochloroacetic acid, the following critical conditions have to be complied with: the temperature is in the range of 0°–5° C., the monochloro acetic acid solution is added little by little to the hydrazine and sodium hydroxide solution in not less than 12 hours.

For the reaction of alkali-cyanate with the solution formed in the first step, the conditions are the following ones: a pH preferably between 3 and 4, at the start, and a pH between 5.5 and 6.5 during the reaction, while the temperature is kept between 15° and 25° C.; thereafter the temperature is raised to the range of 70°–90° C., while the aqueous solution is again acidified.

For the reaction of nitrofurfuraldehyde diacetate, the temperature is kept in the range of 70°–90° C. while maintaining an acid pH.

The separation and purification of nitrofurantoin from the reaction mixture is extremely easy and simple as will be apparent from the following example wherein reference is made to the accompanying drawing, in order to more clearly explain and illustrate the details of the process according to the invention without limiting the same.

EXAMPLE 161 kg. of monochloracetic acid, originally contained in the tank 1, were transferred, together with 111 litres of drinking water, coming from tank 2, into tank 3, made of acid resisting materials, and having a capacity of 700 litres. The resulting solution was fed over a time of 12 hours while keeping the temperature in the range of 0°–5° C. from tank 3, to a reaction vessel 4, made of acid resisting materials, having a capacity of 2000 litres, equipped with a bottom discharge and an anchor stirrer (driven at 40 r.p.m.) and containing 570 kg. of 30% sodium hydroxide, coming from tank 5 and 116 kg. of 80% hydrazine hydrate coming from tank 6. The resulting solution was stirred in the reaction vessel 4 over a 12 hour period at temperature in the range of 0°–5° C.

Thereafter the mixture was acidified with concentrated hydrochloric acid (coming from tank 7), down to a pH-value of 3–4, and 152 kg. of potassium cyanate, coming from tank 8 were added. The temperature was allowed to spontaneously rise up to room temperature and the solution was allowed to react for an additional 4 hours, while adjusting the pH-value to 6–6.5 by means of hydrochloric acid taken from the tank 7.

Then the solution was heated up to 70°–75° C., and acidified by the addition of 570 kg. of concentrated hydrochloric acid, again taken from tank 7, and finally heated at 90° C. over 30 minutes period. 90 kg. of nitrofurfuraldehyde diacetate, coming from tank 9 were added, the resulting solution was stirred at 80°–85° C., for 30–45 minutes, and then cooled down to room temperature, thus causing the crystallization of the raw product, that was separated in a centrifuge 10, and washed with cold water until no more acid traces were present.

The moist, raw N-(5-nitro-2-furfuryliden)-1-aminohydantoin was collected into the container 11, and then introduced into the stainless steel crystallizer 13, having a capacity of 1500 litres, and equipped with an anchor stirrer (driven at 40 r.p.m.). 800 kg. of dimethylformamide, coming from the tank 12 were introduced into the crystallizer, thereby dissolving the N-(5-nitro-2-furfuryliden)-1-aminohydantoin.

The resulting mixture was treated with 1.8 kg. of activated carbon (added into the crystallizer 13), then filtered through the stainless steel filter 14, and the solution transferred into the stainless steel crystallizer 15, having a capacity of 2000 litres and equipped with an anchor stirrer (driven at 40 r.p.m.). In latter crystallizer, the solution was diluted with 800 litres of drinking water, coming from the tank 16; the precipitated product was separated and washed in the centrifuge 17, and the dimethylformamide was recovered in 18. The product was finally dried. Yield: 75 kg. of N-(5-nitro-2-furfuryliden)-1-aminohydantoin (pure, U.S.P. XVI). The dimethylformamide was recovered by fractional distillation, and directly recycled.

*Analysis.*—Calculated for $C_8H_6N_4O_5$: C, 40.34; H, 2.54; N, 23.53. Found: C, 40.40; H, 2.58; N, 23.50.

I claim:

1. A process for preparing N-(5-nitro-2-furfuryliden)-1-amino-hydantoin by reacting in succession monochloroacetic acid, hydrazine hydrate, an alkali cyanate and 5-nitro-2-furfuraldehyde diacetate, comprising slowly adding monochloroacetic acid to an aqueous solution of hydrazine hydrate and sodium hydroxide over a period of time of at least about 12 hours at a temperature of 0°–5° C., the amounts of hydrazine hydrate and sodium hydroxide being about 1.1 moles and 2.5 moles, respectively, per mole of monochloroacetic acid, maintaining the temperature within said range with stirring for at least several hours, thereafter adjusting the pH of the mixture to between 3–4 with concentrated hydrochloric acid, adding about 1.1 moles of an alkali cyanate per mole of monochloroacetic acid to said mixture and allowing the temperature to rise to 15–25° C. and maintaining this temperature for about 3–5 hours at a pH of 5.5–6.5, thereafter raising the temperature of the mixture to 70–90° C., acidifying the mixture with concentrated hydrochloric acid, and reacting the mixture with about 0.2 mole of 5-nitro-2-furfuraldehyde diacetate per mole of monochloroacetic acid at 70°–90° C. to produce as a product said N-(5-nitro 2-furfuryliden)-1-amino-hydantoin, the above reactions being carried out in a single aqueous phase.

2. A process according to claim 1, further comprising cooling the reaction products to precipitate said product, and purifying the product by washing with cold water followed by dissolution in dimethyl formamide and reprecipitation by the addition of cold water.

References Cited

FOREIGN PATENTS 757,822   9/1956   Great Britain.

OTHER REFERENCES

Jack: J. Pharm. & Pharmacol., vol. 11, p. 108T–114T (1959).

HENRY R. JILES, *Primary Examiner.*

HARRY I. MOATZ, *Assistant Examiner.*

U.S. Cl. X.R.

260—309.5, 534